T. IDE.
STATION INDICATOR.
APPLICATION FILED AUG. 5, 1918.
1,316,795.
Patented Sept. 23, 1919.
3 SHEETS—SHEET 1.
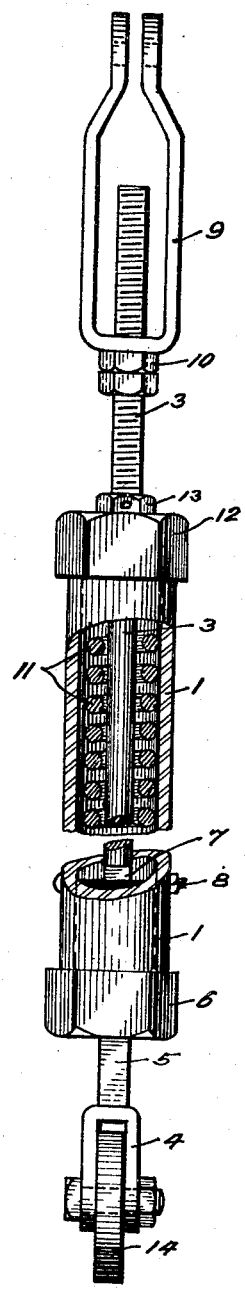
Fig. 2.
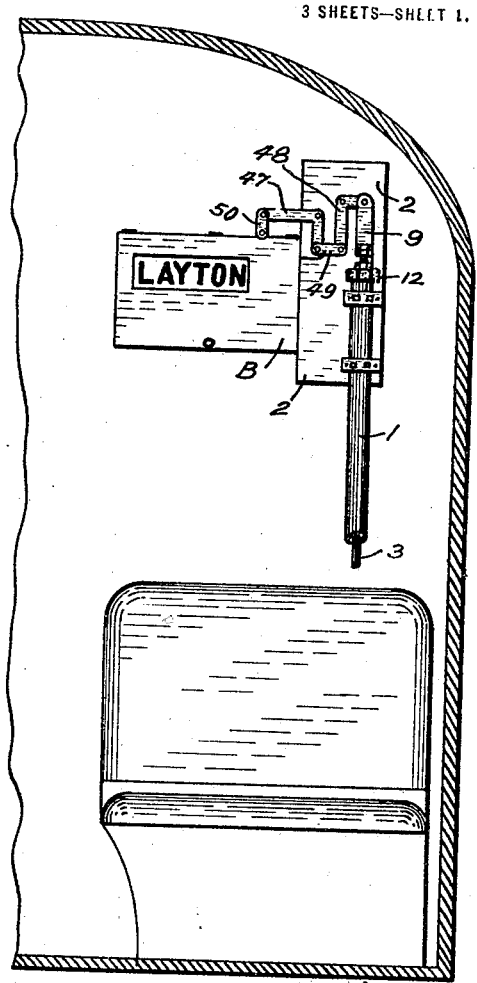
Fig. 1.
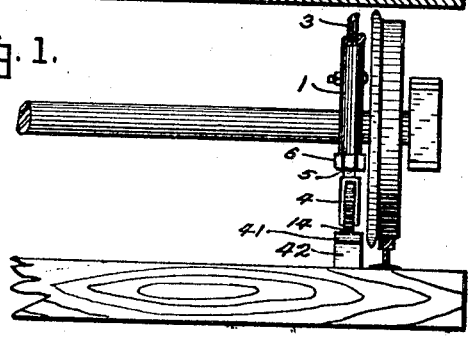
Tsukasa Ide
INVENTOR.
BY J. M. Thomas
ATTORNEY

T. IDE.
STATION INDICATOR.
APPLICATION FILED AUG. 5, 1918.

1,316,795.

Patented Sept. 23, 1919.
3 SHEETS—SHEET 2.

Tsukasa Ide
INVENTOR.

BY J. M. Thomas
ATTORNEY

T. IDE.
STATION INDICATOR.
APPLICATION FILED AUG. 5, 1918.
1,316,795.
Patented Sept. 23, 1919.
3 SHEETS—SHEET 3.
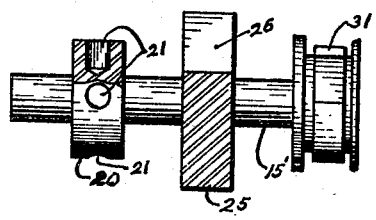
Fig. 9.
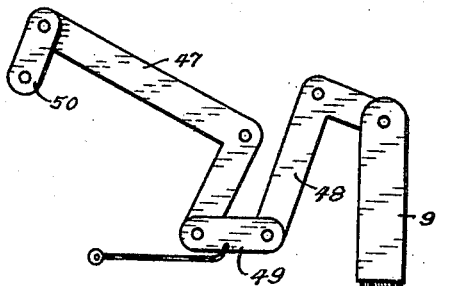
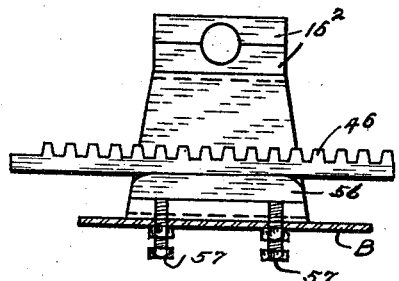
Fig. 10.
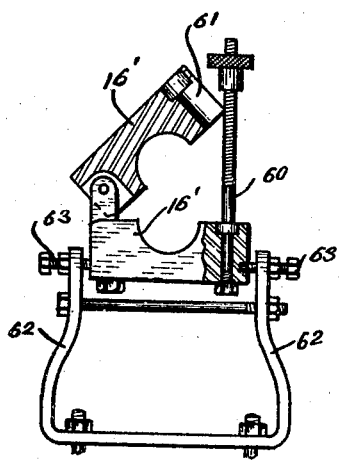
Fig. 12.
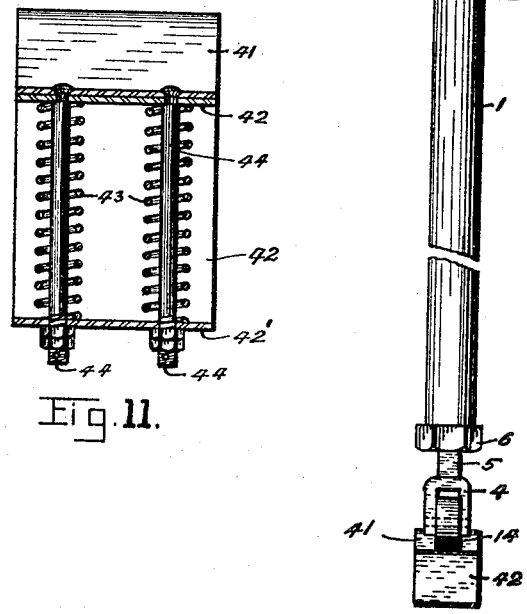
Fig. 11.
Fig. 13.
Tsukasa Ide
INVENTOR.
BY J. M. Thomas
ATTORNEY

UNITED STATES PATENT OFFICE.

TSUKASA IDE, OF BINGHAM, UTAH.

STATION-INDICATOR.

1,316,795.  Specification of Letters Patent.  Patented Sept. 23, 1919.

Application filed August 5, 1918. Serial No. 248,458.

*To all whom it may concern:*

Be it known that I, TSUKASA IDE, a citizen of Japan, residing at Bingham, in the county of Salt Lake and State of Utah, have invented certain new and useful Improvements in Station-Indicators, of which the following is a specification.

My invention relates to means to indicate stations or stopping places for passenger trains, and has for its object to provide an automatic station indicator which will sound a bell and present a sign at a point before a station is reached by passenger carrying conveyances to indicate the next station in time for passengers to get ready to alight. These objects I accomplish with the device illustrated in the accompanying drawings in which similar letters and numerals of reference indicate like parts throughout the several figures and as described in the specification forming a part of this application and pointed out in the appended claims.

Figure 3:
Figure 4:
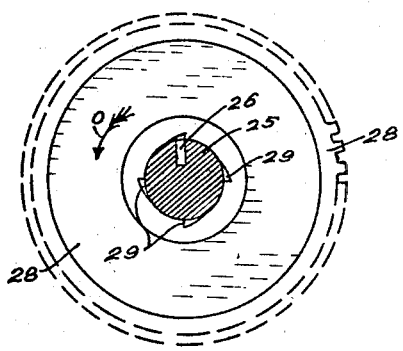
Figure 5:
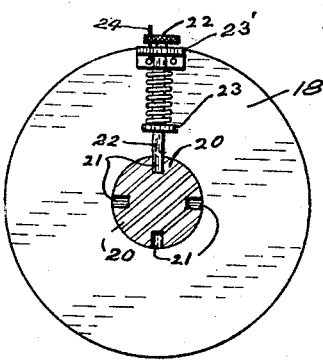
Figure 8:
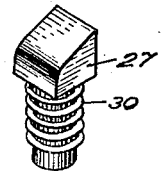
Figure 7:
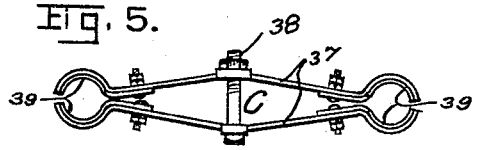
Figure 6:
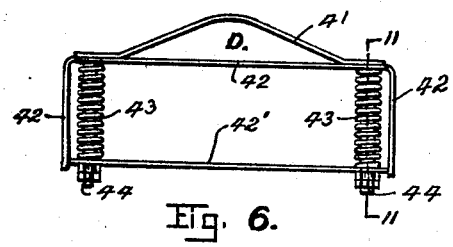

In the drawings in which I have shown a substantial embodiment of my invention, Figure 1 is an elevation of the device in place on a portion of a passenger car, parts shown in section and parts cut away. Fig. 2 is an elevation of the operating bar and connections parts cut away and parts shown in section. Fig. 3 is an elevation of the sign carrying parts of the invention. Fig. 4 is a side elevation of the gear wheel with the dog carrying collar shown in section. Fig. 5 is a section on line 5—5 of Fig. 3. Fig. 6 is a side elevation of the yielding plate. Fig. 7 is a side view of the roller clamp. Fig. 8 is a view of the dog. Fig. 9 is a view showing in detail an elevation of one of the roller shafts, the ratchet wheel, the sleeve collar— parts in section, and the roller adjusting collar portion. Fig. 10 is an elevation of the rack and adjustable wearing shoe, in place between portions of the bearing bases. Fig. 11 is a section on line 11—11 of Fig. 6. Fig. 12 is an elevation of another of the bearing bases and bearing therein parts of which are shown in section. Fig. 13 is an elevation of the operating bar and connections shown in the normal position before engaging the yielding plate.

It is highly desirable that the passengers on a train or street car be notified, before coming to a station, the name of the station in time for them to get ready to alight, and frequently this announcement is not done by the party in charge of the car, and the present invention is intended to automatically sound a bell and present a sign which will make said announcement. The invention consists of a yielding inclined metal plate secured on the rails of a road bed which will cause the other parts of the invention to operate and ring a bell in each car and display a sign announcing the next station with such other information as the operators of the car desire to display such as distance to the end of the run or the elevation of the station, as the car passes over said plate. I contemplate using two of the devices in each car, in order that one will be in front of the passengers when seated.

The said yielding plate is to be fastened to and between the rails and at any desired distance from the station and preferably near the right hand rail before coming to the station from either direction. The present invention consists of a piece of pipe 1 which is to be rigidly fastened to a plate 2 that is secured to the end of the car and on the inside, with the lower portion of said pipe extending through the floor of the car and fastened to the chassis of the car near the wheels. A rod 3 is slidably carried in the said pipe 1 with a portion thereof at the lower end formed into a wheel bearing 4, and another portion squared as at 5 to engage in a cap sleeve 6, with a square hole therein which cap sleeve is screwed on the end of said pipe. In the squared portion 5 of said rod 3 an elongated slot 7 is cut within which slot a bolt 8 is provided and which bolt is passed through the said pipe 1. The upper portion of said rod 3 is threaded and a U-shaped link 9 is screwed thereon and held by a jam nut 10. A spiral spring 11 is carried on said rod 3 within said pipe 1, and a cap sleeve 12 is screwed on the upper end of said pipe 1. A jam nut 13 with a cotter pin therein which pin passes through said rod 3, is screwed on said rod to hold said spring 11 under some tension. A wheel 14 is journaled in said bearing 4.

A casing B is secured on the wall of the car and in which the web and web moving elements are operated. A stub shaft 15 is horizontally mounted in a bearing 16 within said case B and on said shaft is carried the end of the square web carrying roller 17 between the disks 18. A finger nut 19 is secured on one end of said shaft 15 by which said shaft may be manually rotated. Another stub shaft 15' is mounted, in alinement with said shaft 15, in the bearings 16², and the other end of said roller 17 is carried on said shaft. A collar 20 is fastened on said shaft 15' having four radially disposed holes 21 bored therein, and a spring plunger bolt 22 is mounted on one of said disks 18 the end of which bolt seats in one or the other of said holes 21. The said plunger bolt 22 is normally held with its lower end in one of said holes 21, and said bolt 22 is mounted in two brackets 23 and 23' which are fastened to said disk 18 and carries a spiral spring thereon by which said plunger bolt 22 is normally held in engagement with said collar 20. The said plunger bolt has a knurled head within which is secured a pin 24 that is parallel with said bolt and is adapted to operate within a hole in said bracket 23' when in alinement therewith. When the said bolt is to be held out of any of the said holes 21 it is rotated slightly by turning the knurled head until the said pin is out of alinement with the hole in the bracket 23'.

A dog carrying collar 25 is also formed on said shaft 15' and is held between the said bearings 16² and has a radially disposed opening 26 therein, within which a dog 27 is carried. A gear wheel 28 is journaled on said collar 25 and said wheel has four internal notches 29 cut in its inner bearing face within which notches the said dog 27 engages as said gear wheel is rotated on said collar. A spiral spring 30 is carried on the stem of said dog 27 to normally hold said dog in one of said notches 29 yet allow the wheel to rotate and bring another of said notches into engagement with said dog.

A ratchet 31 having four teeth is formed on the end of said shaft 15' and a spring held detent 32 is mounted on one of said bearings 16², which detent engages with said ratchet when said shaft is rotated in one direction and holds said shaft against rotation in the other direction. The said stub shaft 15' with its integral collars 20 and 25, and ratchet 31 is shown in Fig. 9. In another bearing 16' a stub shaft 33 is journaled which shaft has a squared portion axially thereon, and on which squared portion is carried one end of the other roller 34. A coacting stub shaft 36 is journaled in another bearing 16ᵃ and a plunger bolt 40 having an oblong end is carried axially in said shaft with the oblong portion engaging in the end of said roller 34. A crank 35 is secured on said shaft 33 by which the roller 34 and said shafts may be manually rotated if desired. The bearings 16, 16', 16² and 16ᵃ are all split bearings, and bearings 16, 16' and 16ᵃ are hinged at one end as shown in Fig. 12; and are held in contact with their respective shafts by the bolt 60 and knurled nut thereon, and the upper leaf of the bearings has a slot therein, shown at 61, in which said bolt 60 and nut may operate when moving the upper portion or leaf of said bearings 16, 16' and 16ᵃ to remove their respective shafts as desired. The bearing 16' has pivotal connection with its base 62, by means of the tap bolts 63 which are passed through the end portions of said base 62 and seat in a hole in the lower leaf of said bearing in order that said stub shaft 33 may be turned out of alinement with its coacting stub shaft 36 in taking out the said roller 34. A roller brake C is provided to prevent said shafts 33 and 36 from rotating too freely, which brake consists of the two coacting spring pieces 37 held in gripping contact with each of the shafts 15 and 36 by the bolt and nut 38. A friction element 39 made of felt or rubber is held in the end portion of said spring pieces 37. The yielding member D is to be fastened to the rails of the road bed, and consists of a flat piece of iron bent as an A-shaped or curved roof 41 and which is secured on the upper side of a U-shaped member 42. A bearing plate 42' is carried between the legs of said member 42, and four spiral springs 43 are mounted between the said member 42 and said bearing plate 42' on bolts 44 rigidly secured at the head end of each to the piece 42 and passing through holes in the bearing plate 42'. The said bolts are held in place by nuts screwed thereon and cotter pins passed therethrough. A web having station names printed thereon is shown at 45 which web is made of paper with strips of tin across the ends to add strength and aid in fitting said web 45 on said rollers 17 and 34. A toothed rack 46 is carried in the base of one of said bearings 16² with its teeth engaging the teeth of said gear wheel 28 and said rack is operatively connected with said rod 3 by the bell crank levers 47 and 48 and the links 9, 49 and 50. Said rack 46 is adjustably held in mesh with said gear wheel by the wearing shoe 56 which shoe and rack are carried between the bases of the bearings 16², and said shoe 56 is adjusted by the tap bolts 57 in order to take up any wear of said rack teeth or gear teeth. A bell 55 is also mounted in said case B and connected with one of said links 49 which bell will sound when said lever is moved on its fulcrum by said rod 3. And as will be obvious said bell may be sounded when said rack is moved by said lever.

The operation of my device is as follows:—

The web is wound on the roller 34 and the end engaged with the roller 17 by engaging the tin strengthened end in a narrow slit provided in said roller 17, which engagement will bring one of the printed station names on one of the flat faces of the square roller 17. By pulling the plunger bolt 22 out of its engagement with the collar 20 said roller 17 may be rotated by turning the finger nut 19 until the desired printed name of the station is brought in view and shown on the web through a slot in the cover of said case B, that shown being Layton. The space between the station names is large enough to allow for any change in position of the name, due to more or less web being wound on said roller 17, and as constructed the open slot in the casing B is wide enough to allow the station name to clearly appear even should more or less web be taken up by multiple layers of web being wound on said roller, and the web may be of such thin material that any number of layers of web will not make such difference in the position of the names as shown, as to not be observable. With the device in place when the car is run over the yielding plate roof piece 41 the wheel 14 will roll over said roof piece 41 and the rod 3 will be moved longitudinally within the pipe 1, and by means of the links 9, 49 and 50 and the bell crank levers 47 and 48, the rack 46 will be moved longitudinally. The said movement of said rack will rotate said gear wheel 28 in the direction of the arrow o. And as said gear wheel is rotated, the dog 27 will engage in one of said notches 29, and the said shaft 15' with the roller 17 will be rotated and bring the next side face of said roller to the front with the next station on the line of road showing through the slot in the cover of the case B. After the said wheel 14 has passed over the said roof piece 41 the rod 3 will be returned to its normal position by the spring 11 and as said rod is being so returned to the normal position the levers 47 and 48 with their connecting links 9, 49 and 50 will move the rack 46, and this in turn will rotate the gear wheel 28 in the reverse direction to arrow o. By this reverse movement of the gear wheel the said shaft 15' will not be rotated as the detent 32 will engage the ratchet wheel 31 and prevent said shaft from rotating in that direction and the collar 25 with its dog 27 will likewise remain stationary while the gear wheel 28 will be rotated, and the dog 27 will engage in the next notch 29 in said gear wheel ready to move with the gear wheel on its next forward movement in the direction of the arrow o. Should it be necessary to turn said web backward on account of switching the car back and forth over the said roof piece 41 the brakeman or man in charge may pull the plunger bolt 22 radially outward from its engagement with the collar 20 and the web may be then turned backward by rotating the roller 34 with the handle 35 to such extent as will bring the desired station sign in position to be next shown through the slot, the said plunger bolt 22 being the means for locking the rollers with the web thereon to the shafts 15', 33 and 36. The squared portion of the rod 3 and the bolt 8 through the pipe 1 and slot 7 in said rod is the means for holding the said wheel 14 in alinement with the travel of the car.

I have thus provided and shown a sign and signal which will be automatically operated by new and novel shafts, bearings, ratchet and lever connections, as well as a novel operating rod and securing means and locking features for the shafts.

Having described my invention I desire to secure by Letters Patent and claim:—

1. A station indicator for use on a car comprising two stub shafts; a roller having four faces carried on said shafts; means to lock said roller with said shafts; a ratchet wheel fastened on one of said shafts, a detent to engage said ratchet when it is rotated in one direction and leaving it free to rotate in the reverse direction; a collar integral with said shaft having a radially disposed hole therein; a dog carried in said hole; a gear wheel having internal notches therein in which said dog may engage; a rack having teeth engaging with the teeth of said gear wheel; another roller mounted parallel with the first mentioned roller; and a web carried on said rollers.

2. A station indicator for use on a passenger car, comprising two stub shafts; a roller having four faces carried on said shafts; means to lock said roller to one of said shafts; a ratchet wheel on the same shaft; a detent to engage said ratchet wheel when said ratchet wheel is rotated in one direction and leaving it free to rotate in the other direction; a collar integral with the said shaft and having a radially disposed hole therein; a dog carried in said hole; a spring on said dog; a gear wheel having internal notches therein in which said dog may engage; a rack having teeth engaging with the teeth of said gear wheel; another pair of alined stub shafts detachably mounted parallel with said first mentioned shafts; a roller carried between and on said last mentioned stub shafts; a web having station names printed thereon and carried over said rollers; split bearings for said shafts one of which is pivoted to its base; and a brake carried on a stub shaft of each roller to hold the said web taut.

3. A station indicator for use on a passenger car, comprising two stub shafts; a roller having four faces carried on and between said shafts; a collar integral with one of said shafts; a plunger bolt adapted to seat in holes in said collar; a ratchet wheel on the same shaft; a detent to engage said ratchet wheel; a collar integral with the same shaft having a radially disposed hole therein; a dog carried in said hole; a gear wheel having internal notches and journaled on said collar; another roller mounted parallel with the first mentioned roller; a web carried on said rollers; and a brake connecting the shafts of said rollers to hold said web taut.

In testimony whereof I have affixed my signature.

TSUKASA IDE.